United States Patent
Steidl et al.

(10) Patent No.: US 11,236,801 B2
(45) Date of Patent: Feb. 1, 2022

(54) CRANKSHAFT ASSEMBLY COMPRISING A TORSIONAL VIBRATION DAMPER

(71) Applicants: Hasse & Wrede GmbH, Berlin (DE); CENTA Antriebe Kirschey GmbH, Haan (DE)

(72) Inventors: Michael Steidl, Berlin (DE); Florian Knopf, Berlin (DE)

(73) Assignees: Hasse & Wrede GmbH, Berlin (DE); CENTA Antriebe Kirschey GmbH, Haan (DE)

(*) Notice: Subject to any disclaimer, the term of this patent is extended or adjusted under 35 U.S.C. 154(b) by 722 days.

(21) Appl. No.: 16/085,757

(22) PCT Filed: Mar. 16, 2017

(86) PCT No.: PCT/EP2017/056315
§ 371 (c)(1),
(2) Date: Nov. 21, 2018

(87) PCT Pub. No.: WO2017/158131
PCT Pub. Date: Sep. 21, 2017

(65) Prior Publication Data
US 2019/0113101 A1    Apr. 18, 2019

(30) Foreign Application Priority Data
Mar. 17, 2016    (DE) .................. 10 2016 104 953.0

(51) Int. Cl.
*F16F 15/173*        (2006.01)
*F16F 15/126*        (2006.01)
*F16C 3/06*          (2006.01)

(52) U.S. Cl.
CPC .............. *F16F 15/173* (2013.01); *F16C 3/06* (2013.01); *F16F 15/126* (2013.01)

(58) Field of Classification Search
CPC .......... F16F 15/173; F16F 15/126; F16C 3/06
See application file for complete search history.

(56) References Cited

U.S. PATENT DOCUMENTS

| 2,594,555 A | 4/1952 | Hardy |
| 3,992,963 A | 11/1976 | Khanna |

(Continued)

FOREIGN PATENT DOCUMENTS

| DE | 25 53 544 A1 | 7/1976 |
| DE | 195 07 519 A1 | 9/1996 |

(Continued)

OTHER PUBLICATIONS

International Search Report (PCT/ISA/210) issued in PCT Application No. PCT/EP2017/056315 dated Nov. 13, 2017 with English translation (nine pages).

German-language Written Opinion (PCT/ISA/237) issued in PCT Application No. PCT/EP2017/056315 dated Nov. 13, 2017 (11 pages).

(Continued)

*Primary Examiner* — Luis A Gonzalez
(74) *Attorney, Agent, or Firm* — Crowell & Moring LLP (57) ABSTRACT

A crankshaft assembly which is designed for a reciprocating-piston machine of an internal combustion engine includes a crankshaft, a torsional vibration damper for damping resonance torsional vibrations of the elastic torsion modes of the crankshaft, and an output. The torsional vibration damper has a primary mass inertia and a secondary mass inertia, the primary mass inertia being rigidly connected to a crankshaft and the secondary mass inertia being coupled as a seismic mass with a viscous liquid to the primary mass inertia. The torsional vibration damper is configured to assume the function of a flywheel for reducing rotational non-uniformity in addition to the function of reducing the resonance torsional vibrations of the crankshaft. The torsional vibration damper is attached to an output end of the crankshaft, and the torsional vibration damper forms a centrifugal mass which is divided into a primary (Continued)

mass inertia and a secondary mass inertia, wherein the three functions of a clutch functional section, a flywheel and a torsional vibration damper are integrated into the torsional vibration damper.

24 Claims, 5 Drawing Sheets

(56) References Cited

U.S. PATENT DOCUMENTS

| | | |
|---|---|---|
| 5,050,446 A | 9/1991 | Takashima et al. |
| 5,979,390 A | 11/1999 | Depp et al. |
| 6,161,450 A | 12/2000 | Sandig |
| 2013/0068580 A1 | 3/2013 | Doegel et al. |

FOREIGN PATENT DOCUMENTS

| | | |
|---|---|---|
| DE | 196 21 460 C1 | 7/1997 |
| DE | 100 05 544 A1 | 8/2001 |
| DE | 20 2004 021 437 U1 | 4/2008 |
| DE | 10 2011 007 118 A1 | 12/2011 |
| DE | 10 2012 107 554 A1 | 2/2014 |
| DE | 10 2014 111 953 A1 | 2/2016 |
| EP | 0 503 424 B1 | 5/1995 |
| JP | 2007-315416 A | 12/2007 |
| WO | WO 2005/038293 A1 | 4/2005 |

OTHER PUBLICATIONS

German-language Office Action issued in counterpart European Application No. 17 711 173.9 dated Sep. 23, 2019 (three pages).

CRANKSHAFT ASSEMBLY COMPRISING A TORSIONAL VIBRATION DAMPER

BACKGROUND AND SUMMARY OF THE INVENTION

The invention at first relates to a crankshaft assembly comprising a torsional vibration damper.

Reciprocating piston machines in the form of internal combustion engines convert the driving linear movement of the pistons by means of crankshafts into rotary movements and thereby generate a usable propulsion. In order to achieve an even running of the machine, the crankshaft is provided with a flywheel, which reduces the rotational nonuniformity caused by the machine. Flywheels are usually installed at the output end of the crankshaft, so as not to transmit the rotational nonuniformity of the engine into the drive train.

Especially in multicylinder engines the flywheel with its even running also means that the first elastic torsional eigenvibration form of the crankshafts or crankshaft assembly has a vibration node in the vicinity of the flywheel. Due to the positioning of the flywheel at the output end on the crankshaft, little or no upper harmonics of the vibration get into the output train.

Due to the regularity of the torsional vibration excitations, under certain circumstances resonance augmentations may occur, which may result in failure of components. In order to lessen such resonance augmentations inside the engine, torsional vibration dampers are installed.

The following terminology definitions shall be used in this document:

Rotational nonuniformity (rigid body motion) vs. elastic mode.

The rotational nonuniformity of a shaft denotes the fluctuation in rotary speed of the overall shaft, in which case the shaft may be treated as a rigid body. The corresponding eigenfrequency is $f_0=0$ Hz. Since the shaft itself in this case does not twist, neither do any stresses occur in the shaft, i.e. the rotational nonuniformity does not lead to strength problems in the shaft. High rotational nonuniformity means that, e.g. a valve train controlled by the crankshaft no longer works with adequate precision.

In an elastic mode (eigenvibration form), the shaft twists, and the eigenfrequencies and resonances are greater than zero. Vibrations in an elastic mode cause stresses in the shaft and may thus be strength-relevant.

In common speech, every kind of vibration reduction is often called a damping. This document distinguishes in more detail the following principles (see, for example, DIN 1311: Vibrations and vibratable systems, VDI 3833: Vibration dampers and vibration absorbers, VDI 2039: Torsional vibrations in the drive train):

Damping:

Damping is the conversion of movement energy (kinetic energy) into forms of energy not effective for the particular vibratable system. The dampers here bring about a conversion of kinetic energy into heat based on internal or external friction processes. Thus, damping is energy dissipation. Damping brings about a reduction in the resonances of a system and does not reduce the rotational nonuniformity of a torsionally vibratable system.

Examples: Viscosity-Type Torsional Vibration Damper, Frictional Damper

Absorption:

The principle of vibration absorption is based on a mass force compensation—the absorbing mass vibrates in opposite phase to the exciting force. An absorber additionally mounted on a vibratable system increases the number of degrees of freedom of the system by at least one.

The absorber can be attuned in various ways, as needed:

1. A fixed exciter frequency is absorbed by tuning to this frequency. The damping of the absorber should be the least possible, resulting in a large resonance augmentation outside of the absorption region.

2. A fixed exciter frequency range is absorbed by tuning to the center frequency. The damping should be optimized according to the width of the frequency range.

3. A resonance frequency is absorbed by a tuning to the corresponding eigenfrequency.

The exact tuning frequency and the choice of the damping are specific to the application. Normally, the tuning is done such that the augmentations in the amplitude vs. frequency curve at the lower and upper absorber resonance frequency are the same. A softer/harder absorber tuning will increase/decrease the augmentation of the upper absorber resonance while at the same time decreasing/increasing the lower absorber resonance augmentation.

Examples: Rubber Absorber, Steel Spring Absorber

A special case is the speed adaptive absorber (DAT).

In speed adaptive absorbers (DATs), the absorber frequency changes in proportion to the rotary speed. The DAT is used to absorb exciter orders, i.e. exciter frequencies changing in proportion to the rotary speed. Since its tuning frequency and thus also its absorption frequency change with the rotary speed, the DAT cannot be meaningfully tuned to (fixed) system eigenfrequencies. The concept of the speed adaptive absorber makes it possible to largely eliminate the disruptive torsional vibrations of one order in the entire drive train directly at the source, i.e. roughly on the crankshaft of an internal combustion engine. Practically designed DATs are almost always centrifugal pendulums and they are used to reduce the rotational nonuniformities by absorbing the first engine major order.

Vibration Isolation:

Vibration isolation is also called decoupling in common speech. The electrical analog is a low-pass filter. In vibration isolation, the one system is isolated from another by a soft, elastic connection of two subsystems. A limit frequency exists in vibration isolation: vibrations with frequencies above the limit frequency are decreased, while vibrations with frequencies below the limit frequency are intensified.

Examples: Decoupled Belt Pulley, Two-Mass Flywheel (ZMS), Elastic or Hydraulic Clutches Vibration reduction can also additionally be done by a suitable detuning of the vibratable system or by a changing of the vibration excitation, for example by changing the ignition sequence of the internal combustion engine.

Damping, absorbing and isolating are usually done with passive components. An active vibration reduction with active components (actuators with auxiliary power) is also possible, yet it is very seldom in practice. In semi-active components, the properties of passive components are suitably changed. For example, damping elements may be switched in to work through resonances.

With increasing engine power, especially Diesel motors, a need has been created for more powerful vibration dampers. Viscosity-type torsional vibration dampers have found a place here. Several embodiments are described, for example, in DE 195 07 519 A1, DE 20 2004 021 437 U1 and DE 10 2012 107 554 A1.

Since a torsional vibration damper in or near a vibrational node has little or no effectiveness, it is mounted at the end of the crankshaft opposite the flywheel. At present, the crankshaft assembly of an engine is thus always constructed as follows: torsional vibration damper—crankshaft—flywheel—clutch output, i.e. the principal portion of the engine power is picked off at the side of the engine with the flywheel and clutch. In many cases, especially as regards the larger engines, the damper is a viscosity-type torsional vibration damper and the clutch is an elastomer clutch.

Although this crankshaft assembly is not directly described in the patent literature, various described solutions indicate combinations with belt pulley (U.S. Pat. No. 2,594,555, EP 0 503 424 B1) or with camshaft meshing (DE 196 21 460 C1). Here, the belt pulley as well as the camshaft drive are situated opposite the output end.

Moreover, DE 100 05 544 A1 should be mentioned as prior art, which proposes connecting to a flywheel of a crankshaft assembly in the radially outer region a deflection mass carrier of a device designed as a vibration absorber. In this way, a speed adaptive absorber (DAT) is created with the features described at the outset. No resonances of the crankshaft are reduced, but only rotational nonuniformities in the drive train.

One drawback of the mentioned solutions is that the reciprocating piston machine or internal combustion engine needs to be outfitted with multiple functional elements—viscosity-type torsional vibration damper at the free end of the crankshaft, flywheel and then clutch mounted on the flywheel at the output end of the crankshaft. The torsional vibration damper here serves for preventing resonance augmentation/reducing stresses in the crankshaft, the flywheel serves for preventing high rotational nonuniformities, and the clutch serves for isolating a further drive train from the remaining vibrations of the reciprocating piston machine. This known layout contains all essential elements needed for the operation of a drive train with internal combustion engine—also called a reciprocating piston engine here: the torsional vibration damper at the front end of the crankshaft reduces the stresses arising in the crankshaft due to the excitation of the elastic modes to a non-dangerous level, the flywheel ensures a sufficiently slight rotational nonuniformity (rigid body movement of the crankshaft), and the clutch isolates the further drive train from the residual vibrations of the internal combustion engine which are present despite the damper and flywheel. These multiple functional elements, independent of each other, increase the weight of the machine, as well as its costs. Furthermore, the multiple functional elements take up a certain space, which restricts the compact design of a reciprocating piston machine.

The problem which the invention proposes to solve is to create an improved crankshaft assembly as compared to the prior art.

The problem is solved by a crankshaft assembly which is designed for a reciprocating piston machine of an internal combustion engine or which forms or is such a machine, including a crankshaft, a torsional vibration damper for damping resonance torsional vibrations or elastic torsion modes of the crankshaft, and an output, wherein the torsional vibration damper consists of a primary mass or mass inertia and a secondary mass or mass inertia, wherein the primary mass inertia is firmly connected to a crankshaft and the secondary mass inertia is coupled as a seismic mass inertia by a viscous liquid to the primary mass inertia, wherein the torsional vibration damper is designed to also assume the function of a flywheel for reducing rotational nonuniformity, in addition to the function of reducing the resonance torsional vibrations of the crankshaft. For this, the sum of primary inertia and secondary inertia as well as the coupling of the secondary inertia to the primary inertia in particular should be chosen large enough to ensure an adequate reduction of the rotational nonuniformities—i.e. one which is adequate for a safe operation—at the relevant frequencies. The torsional vibration damper in this case is arranged at an output end of the crankshaft, and three functions are integrated in the torsional vibration damper, or it comprises three correspondingly designed sections: clutch functional section—especially an elastomer clutch—flywheel, and torsional vibration damper. This multiple integration of functions in a structural design unit results in a simplified construction of the overall crankshaft assembly, a lessening of the overall mass of the drive train, a lessening of the rotational mass inertia moment of the drive train, and a more compact construction of the drive train.

In this way, a combined solution has been found which contains all essential elements needed for the operation of the drive train (damping, reduction of rotational nonuniformity, isolation), but provides them not in the form of multiple components, and instead in the form of a single integrated component. As compared to the former arrangement of the components both at the free end of the crankshaft and at the output end, the new integrated component is located solely at the output end of the crankshaft.

It is advantageous for the clutch functional section to be integrated directly in a housing of the torsional vibration damper.

It is preferable for a major portion of the power of the internal combustion engine—more than 50%—to be put out across the torsional vibration damper (3) and the clutch functional section.

According to one variant, it is optionally advantageous and simple in terms of design for the clutch functional section to have a radially inner ring, on whose outer circumference an elastomer clutch ring is secured on its inner circumference, the inner ring being coupled to the primary mass inertia, and for the outer circumference of the elastomer clutch ring to be secured on an outer ring, which is part of an input element of a transmission. This makes possible an especially compact design, and furthermore an especially slight rotational mass inertia moment of the drive train is achieved. In this way, the eigenfrequencies can be increased, especially the eigenfrequencies which are relevant to strength, so that there is no excitation of the eigenfrequencies in the relevant speed range and thus the stresses in the crankshaft are reduced.

It may furthermore be provided advantageously, and this even results in the integrating of a fourth function, that the ring-shaped primary mass inertia is provided with a preferably encircling toothing on its outer circumference, especially to form a starter rim.

It is also advantageous, according to one embodiment, for the torsional vibration damper to form a flywheel mass which is divided into a preferably small primary mass inertia and a preferably larger secondary mass inertia, preferably such that the combination of primary and secondary mass inertia at low speeds, i.e. low frequencies, behaves almost like a rigid body, so that its entire mass inertia is active and the rotational nonuniformity of the engine is reduced, as in the case of a flywheel, and such that the combination of primary and secondary mass inertia at high speeds and high frequencies behaves like a damper.

The ratio between the secondary mass inertia and the primary mass inertia is at least greater than 1/2. Preferably this ratio is 1/1 or even greater than 1/1. In the latter case, it is again especially preferable and advantageous for the ratio between the secondary mass inertia and the primary mass inertia to be 2/1 or greater than 2/1.

For example, if the structural space of a standard SAE flywheel needs to be utilized, it is difficult to realize a large ratio between the secondary mass inertia and the primary mass inertia on account of the limited structural space and the boreholes which may need to be provided.

The torsional vibration damper of the crankshaft assembly thus once again has a primary mass inertia and a secondary mass inertia, the primary mass inertia being firmly connected to a crankshaft and the secondary mass inertia being coupled as a seismic mass elastically damping to the primary mass inertia. The torsional vibration damper here also assumes the function of a flywheel for reducing rotational nonuniformity, in addition to the function of reducing the torsional vibrations of the crankshaft. Thus, it replaces the flywheel in a simple manner. Preferably, therefore, no further flywheel is provided on the crankshaft assembly. Since the flywheel is replaced by a torsional vibration damper, a similar dynamic behavior of the crankshaft assembly can thus be achieved to that in the currently usual assembly, but without an additional damping element. In this way, one component is eliminated, which saves on weight as well as production costs. Thanks to the eliminating of the usual damper on the front end of the crankshaft and the integration of the primary end of the clutch in this component, a reciprocating piston engine of this kind can also be more compact in construction.

If a damper is arranged on a classical large flywheel, it has no effectiveness on account of its proximity to the vibration node, as already explained above. According to the invention, however, the flywheel is designed as a torsional vibration damper. The flywheel mass is divided into a preferably small primary and a relatively larger secondary mass inertia, the primary mass inertia being firmly connected to the crankshaft and the secondary mass inertia being connected as a seismic mass elastically damping to the primary mass inertia. The weight of the torsional vibration damper is increased as compared to the traditional torsional vibration dampers. The additional weight is distributed disproportionately on the secondary mass inertia, as compared to the primary mass inertia. Such a layout has the following behavior, with an appropriate tuning of the elastically damping elements: at low speeds, i.e. low frequencies, the combination of primary and secondary mass inertia behaves like a rigid body, so that its entire mass inertia is active and the rotational nonuniformity of the engine is reduced, as in the case of a flywheel. Since at the same time the usually heavy flywheel is totally eliminated, the total weight is therefore lower than for a conventional layout of the drive train.

At high speeds and high frequencies, when the rotational nonuniformity plays a slight role, the combination of primary and secondary mass inertia behaves like a damper with a very high secondary mass inertia. In this situation, the torsional vibrations of the elastic torsion modes are preferably reduced.

With this layout, the torsional vibration damper can be mounted in the original position of the flywheel and thereby perform both functionalities, augmented by the functionality of a coupling to the transmission of the internal combustion engine.

In this way, a crankshaft assembly is provided which consists of a crankshaft, a torsional vibration damper of the above-described kind with integrated clutch and integrated flywheel function and an output, without the crankshaft assembly containing an additional flywheel.

The fluid shear means is preferably a silicone oil.

A second aspect of the invention relates to a device with which an improved damping of torsional vibrations of a crankshaft of an internal combustion engine can be achieved as compared to the prior art.

According to the invention, the device serves for damping the torsional vibrations of a crankshaft of an internal combustion engine. The device comprises a torsional vibration damper and an elastic clutch. The torsional vibration damper comprises a primary mass body, which is firmly connected to an output end of the crankshaft. The torsional vibration damper furthermore comprises a secondary mass body, which is coupled by way of a viscous fluid to the primary mass body. The secondary mass body can move relative to the primary mass body. Advantageously, for example, it may be provided that the secondary mass body is formed by a ring body, which is arranged around the primary mass body in the circumferential direction.

Furthermore, according to the invention, an elastic clutch is provided, which is connected to the primary mass body.

In this way, a device can be created making possible a damping of torsional vibrations of a crankshaft in an improved manner as compared to the prior art.

To avoid repetition, reference is made to the above as regards the meaning of the terms used and the understanding of the features and the portrayal of the benefits of the invention. The term primary mass body corresponds to the previously used term primary mass inertia and the term secondary mass body corresponds to the previously used term secondary mass inertia.

It is clear to the skilled person that the device can be combined at will with one or more features of the previously described crankshaft assembly, and any such combinations will lie within the scope of the invention and be covered by the invention.

An elastic clutch is an element arranged in the power flow path between crankshaft and generator or transmission, enabling a transfer of torque from the clutch input end to the clutch output end, yet allowing slight rotation angles, so-called rotation angle offset, between clutch input end and clutch output end by generating elastic restoring forces.

An elastic clutch may comprise one or more elements of elastic rubber like material, such as natural rubber, or alternatively other spring elements, such as metallic elements like torsion springs, for example.

Advantageously, the input end of the elastic clutch is directly connected to the primary mass body.

According to one advantageous embodiment of the invention, the clutch is connected after the primary mass body. This statement pertains to the force flow path from the crankshaft to the generator or transmission.

According to another advantageous embodiment of the invention, the elastic clutch comprises at least one element made of elastic rubberlike material. This embodiment makes possible the use of components of components of traditional clutches.

According to another advantageous embodiment of the invention, the torsional vibration damper forms with the clutch a structural unit or a handling unit. This makes it possible to achieve a compact design and to integrate various functions in a single structural unit.

According to another advantageous embodiment of the invention, the clutch can be secured releasably on the torsional vibration damper, in particular, secured axially. This embodiment of the invention makes possible an especially simple mounting and possibly a simple dismounting for maintenance and repair purposes. Thus, for example, it may be provided that the elastic elements present in the elastic clutch, such as elastic rubberlike elements, can be easily replaced after reaching a predetermined maintenance interval or in case of repairs.

According to another advantageous embodiment of the invention, the secondary mass body is formed by a ring, which surrounds the primary mass body. This embodiment likewise enables the use of traditional torsional vibration dampers.

According to another embodiment of the invention, the clutch is provided by a substantially ring-shaped arrangement. This enables an embodiment of the device according to invention with which even large torques can be transmitted.

According to another advantageous embodiment of the invention, the assembly is positioned radially inside the primary mass body. This embodiment enables an especially compact, namely an axially short design.

According to an alternative embodiment of the invention, the assembly is positioned axially next to the primary mass body. This enables the use of a clutch with ring-shaped arrangement with a large diameter, with which large torques can be transmitted.

BRIEF DESCRIPTION OF THE DRAWINGS

In the following, the invention shall be explained further with the aid of sample embodiments, making reference to the figures.

DETAILED DESCRIPTION OF THE DRAWINGS

Sample embodiments of the invention are described as examples in the following description of the figures, also making reference to the drawings. For the sake of clarity—also when different sample embodiments are involved—the same or comparable parts or elements or areas are given the same reference numbers, sometimes with the addition of lower case letters.

Features which are only described in relation to one sample embodiment may in the scope of the invention also be provided for every other sample embodiment of the invention. Such modified sample embodiments—even though not represented in the drawings—are also included in the invention.

All disclosed features are essential to the invention in themselves. In the disclosure of the application, there is hereby also incorporated the disclosure content of the corresponding priority documents (copy of the prior application) as well as the cited documents and the described devices of the prior art in their entirety, also for the purpose of including one or more features of these documents in one or more claims of the present application.

Figure 1:
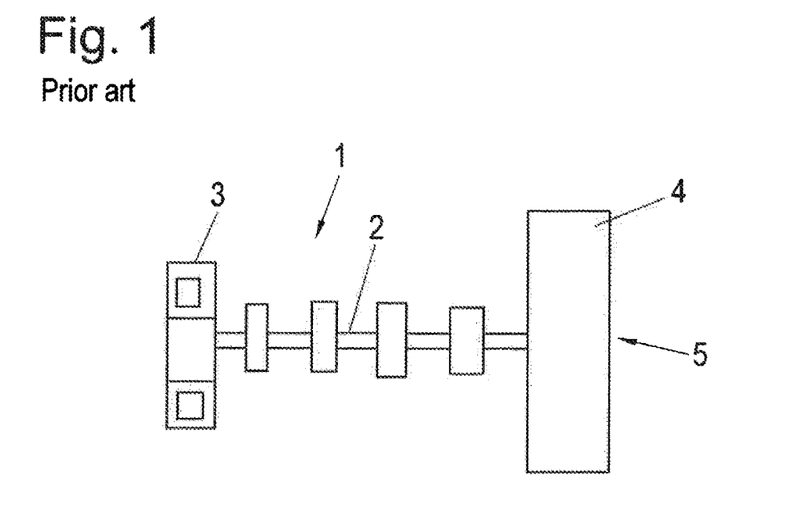
FIG. 1 shows a crankshaft assembly according to the known prior art.

A known prior art is shown by FIG. 1. The crankshaft assembly 1 shows a crankshaft 2, having a flywheel 4 arranged on its output end 5. This flywheel 4 serves for reducing the rotational nonuniformity and ensures an even running of the crankshaft assembly. The flywheel 4 produces a vibration node of the crankshaft assembly 1 in proximity to the flywheel 4. Therefore, it does not make sense to couple the torsional vibration damper 3 to the flywheel 4, since the effect in this position would be slight. For this reason, a torsional vibration damper 3 which serves for reducing the torsional vibrations of the crankshaft assembly 1 is arranged at the opposite end of the crankshaft 2. To the right of the flywheel 4 is an output, such as a transmission or a generator or the like (not shown).

Figure 2:
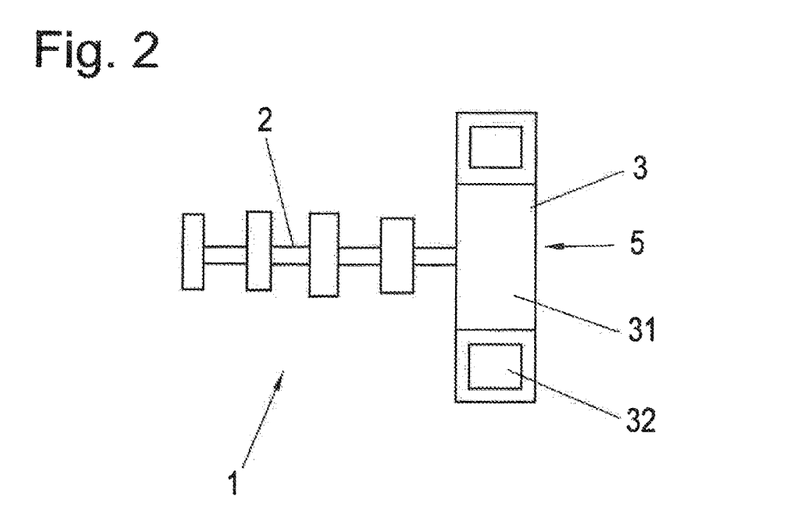
FIG. 2 shows another crankshaft assembly.

FIG. 2 shows another crankshaft assembly 1 as an intermediate step on which the invention is based. This crankshaft assembly 1 is especially suited to a reciprocating piston engine, especially an internal combustion engine. The flywheel 4 has been replaced by a torsional vibration damper 3. This is fastened to the output end 5 of the crankshaft 2. The torsional vibration damper 3 is thus situated in the original position of the flywheel. Since the torsional vibration damper 3 also assumes the task of reducing the rotational nonuniformity, it requires a suitable attuning between the primary mass inertia 31, which is firmly connected to the crankshaft, and the secondary mass inertia 32, which is arranged seismically, elastically damping on the primary mass inertia 31. The suitable attuning has the effect that, at low speed, i.e. low frequencies, the connection between primary mass inertia 31 and secondary mass inertia 32 can be considered rigid. The two masses 31, 32 form a kind of unit and function as a flywheel at low speeds. In this situation, torsional vibrations are less important to an engine. No further flywheel 4 is needed in such a crankshaft assembly 1.

At higher speed, i.e. higher frequencies, the larger secondary mass inertia 32 comes into play and dampens the torsional vibrations. The torsional vibration damper 3 works in its original form. In this operating state, i.e. at high speeds, the rotational nonuniformity is less important.

The crankshaft assembly 1 shown in the example shows a schematic diagram for a four-cylinder engine. The invention is not confined to this; it may also be used as a crankshaft assembly for engines with a fewer or greater number of cylinders, especially those with six, eight, ten or twelve cylinders.

Figure 3:
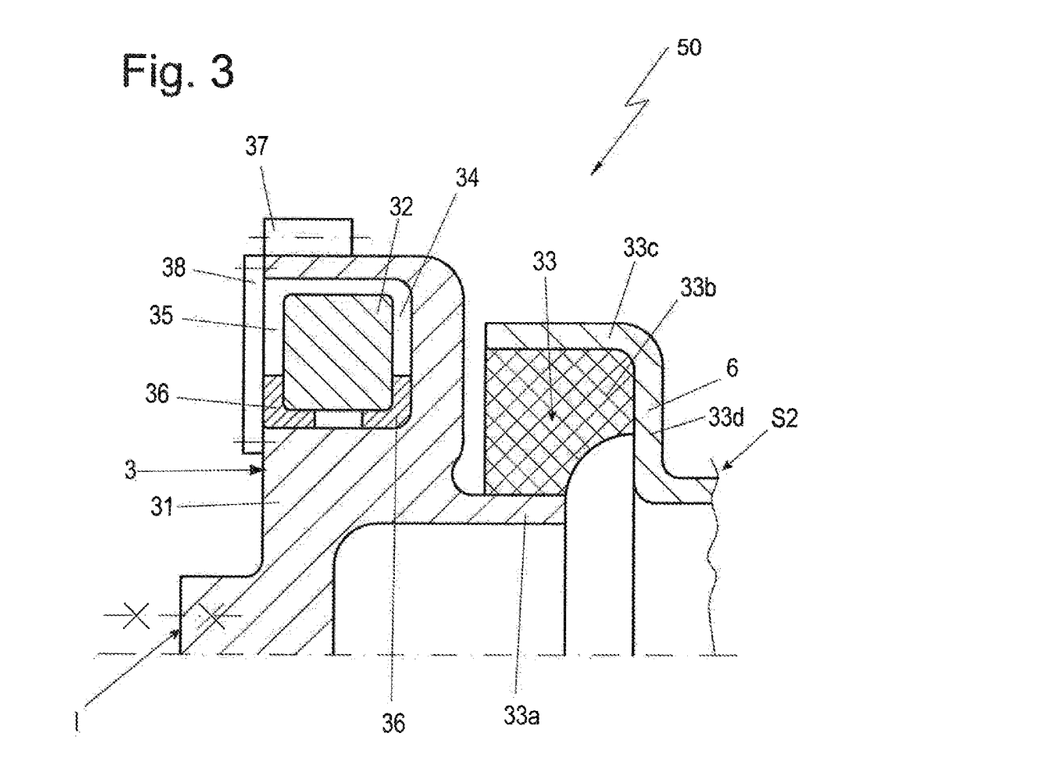
FIG. 3 shows a section of a crankshaft assembly according to the invention or a device according to the invention for damping torsional vibrations.

FIG. 3 shows a section 50 of an embodiment of a crankshaft assembly 1 according to the invention. The section 50 in the context of this patent application is also called a device 50 for damping of torsional vibrations of a crankshaft. This crankshaft assembly 1 as well is particularly suitable for a reciprocating piston engine, especially an internal combustion engine.

The flywheel 4, once again, has been replaced by a torsional vibration damper 3, which also assumes flywheel functions.

Therefore, once again a torsional vibration damper or the torsional vibration damper 3 is fastened to the output end 5 of the crankshaft 2 (and this at an interface or torque coupling end S1). The torsional vibration damper 3 is thus situated in the original position of a flywheel or the flywheel.

The torsional vibration damper comprises a, or the, ring-shaped primary mass inertia 31, which is firmly connected to the crankshaft, and the secondary mass inertia 32, which is fashioned here as a ring, which is arranged in a chamber 34 of the primary mass inertia, a gap 35 between these two masses being filled with viscous medium, especially silicone oil. The secondary mass inertia 32 is mounted in the chamber by one or more bearing rings 36, which are installed in the gap 35, so that it can perform relative angular movements or rotary movements relative to the primary mass inertia 31.

The likewise ring-shaped primary mass inertia 31 may in one optional modification be provided on its outer circumference with a preferably encircling toothing 37. This advantageously simply forms an arrangement which can be used as a starter ring, or which forms such a starter ring, in an internal combustion engine (not represented here).

The chamber 34 may be closed toward one side with a ring-shaped cover 38. It is optionally possible (not shown here) to arrange fan blades on the primary mass inertia 31.

Here as well, a suitable attuning has the effect that, at low speed, i.e. low frequencies, the connection between primary mass inertia 31 and secondary mass inertia 32 can be considered rigid. The two masses—the primary mass inertia and secondary mass inertia—31, 32 form a kind of unit and function as a flywheel at low speeds.

In this situation, torsional vibrations are less important to an engine. Neither is another flywheel 4 needed in this crankshaft assembly 1. At higher speed, i.e. higher frequencies, the larger secondary mass inertia 32 comes into play and dampens the torsional vibrations. The torsional vibration damper 3 works in its original form. In this operating state, i.e. at high speeds, the rotational nonuniformity is less important.

Furthermore, according to FIG. 3, a clutch functional section 33 is also integrated directly in the torsional vibration damper 3. The clutch functional section 33 is coupled directly to an input element 6 of an otherwise not represented transmission or output (interface or torque coupling site S2). The integration of three functions is advantageous: clutch, flywheel, and torsional vibration damper in the torsional vibration damper assembly.

Figure 4:
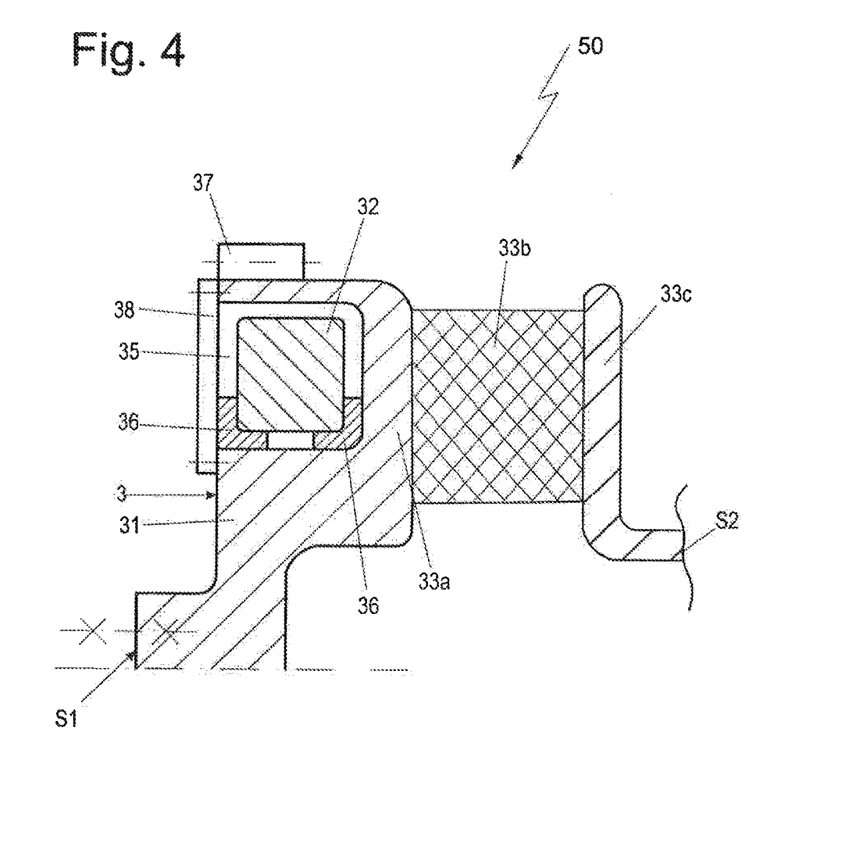
FIG. 4 shows a section of another crankshaft assembly according to the invention or a device according to the invention for damping torsional vibrations.
Figure 5:
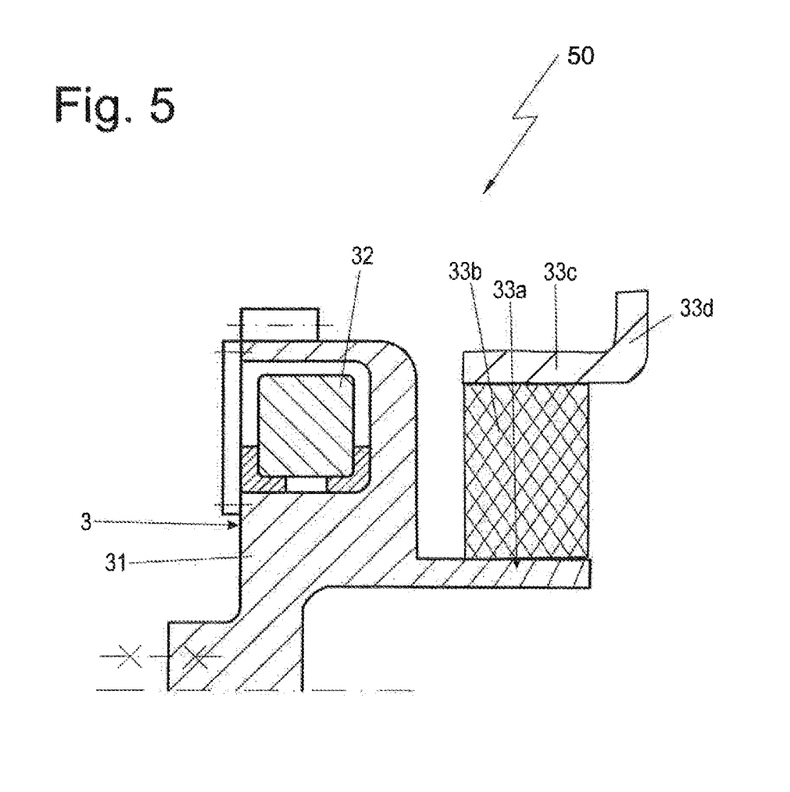
FIG. 5 shows a section of another crankshaft assembly according to the invention or a device according to the invention for damping torsional vibrations.

According to FIGS. 3 and 4 as well as FIG. 5, the clutch functional section 33 is constructed each time as an elastomer clutch. This preferably has either a radial or an axial layout. It then further preferably has in each case a first ring 33*a*, on which an elastomer clutch ring 33*b* is secured, the first ring 33*a* being coupled to the primary mass inertia 31, and moreover the elastomer clutch ring 33*b* is secured to a second ring 33*c*, which is part of an output or an input element 6 of a transmission 6 or a generator or the like. The second ring 33*c* thus forms an elastomer connection, e.g. designed as a ring, especially a form-fitting sleeve (plug-in ring).

According to FIG. 3, the clutch functional section 33 comprises as its first ring an inner ring 33*a*, on whose outer circumference the elastomer clutch ring 33*b* is secured at its inner circumference. The inner ring 33*a* is coupled to the primary mass inertia 31 (for example, formed as a single piece with it or screwed to it). The outer circumference of the elastomer clutch ring 33*b* is secured on an outer ring 33*c* as the second ring, which is part of the input element 6 of the transmission. The inner ring 33*a* and/or the outer ring 33*c* may be formed as sleeve segments. The inner ring 33*a* lies on the inside toward the elastomer clutch ring 33*b*, which in turn lies radially on the inside toward the outer ring 33*c*.

A largely similar arrangement to FIG. 3 is shown by FIG. 5. The layout corresponds to that of FIG. 5, however the outer ring 33*c*—unlike in FIG. 3—at its end facing axially away from the elastomer clutch ring 33*b* passes into a segment 33*d* extending radially outward. In this way, an as large as possible radial flow of force through the elastomer clutch ring 33*b* is achieved. In FIG. 3, on the other hand, more of a diagonal flow of force through the elastomer clutch ring 33*b* is achieved. Because in FIG. 3—unlike in FIG. 5—the outer ring 33*c* at its end facing axially away from the elastomer clutch ring 33*b* passes into a segment 33*d* extending axially inward.

The inner ring 33*a* or the outer ring 33*c* may be configured such that the connection to the elastomer element 33*b* occurs by positive locking. In this way, the clutch functional section becomes pluggable and the mounting of the drive train is simplified.

According to FIG. 4, the clutch functional section 33 has an axially first inner ring 33*a* or a ring segment as the first ring, on which the elastomer clutch ring 33*b* is secured axially at a first axial end, wherein the first ring 33*a* is coupled to the primary mass inertia 31, and wherein an axially second end of the elastomer clutch ring 33*b* is secured axially on the second ring 33*c*, which is part of an input element 6 of a transmission 6 or a generator or the like. This arrangement as well is very compact with low weight and is easy to realize structurally.

As shown in FIGS. 3 to 5, the clutch functional section 33 can in a simple way have a layout such that a more diagonal, a more axial, or a more (or in each case substantially) diagonal force transmission is made possible or realized.

Further functions can be incorporated in the clutch section, such as cooling ducts for the elastomer. Thus, the elastomer clutch ring may have for this purpose one or more ventilation spaces, especially gaps (not shown here).

The invention is not meant to be restricted by the description of the sample embodiments to these special configurations. Silicone oil is mentioned as the shear means; but all other shear means known for these purposes are also possible. The sizes and dimensional ratios also should not be restricted by this sample embodiment.

Figure 6:
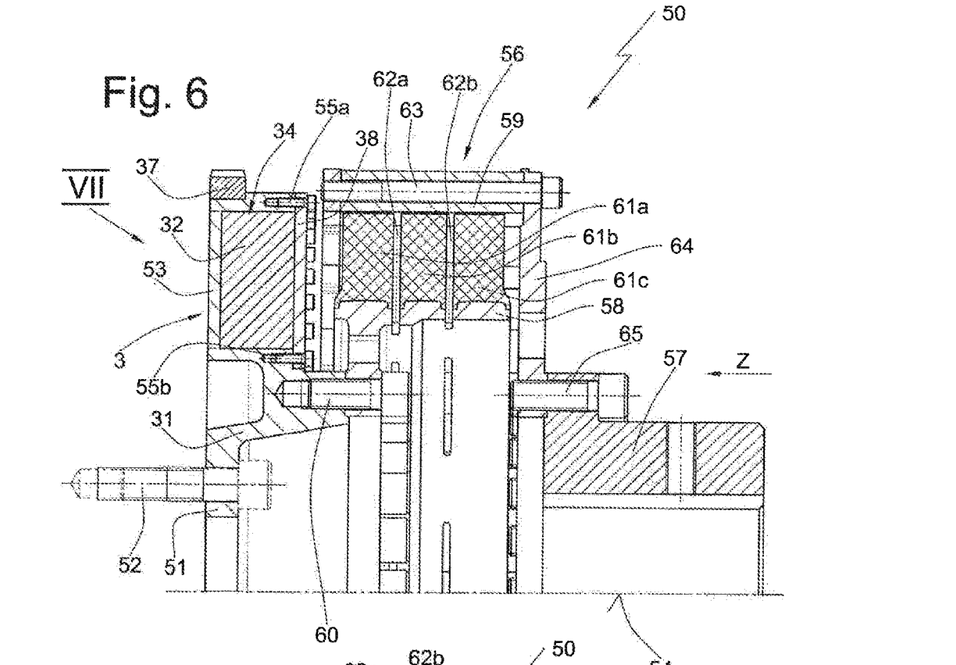
FIG. 6 shows another sample embodiment of a crankshaft assembly according to the invention or a device according to the invention.
Figure 7:
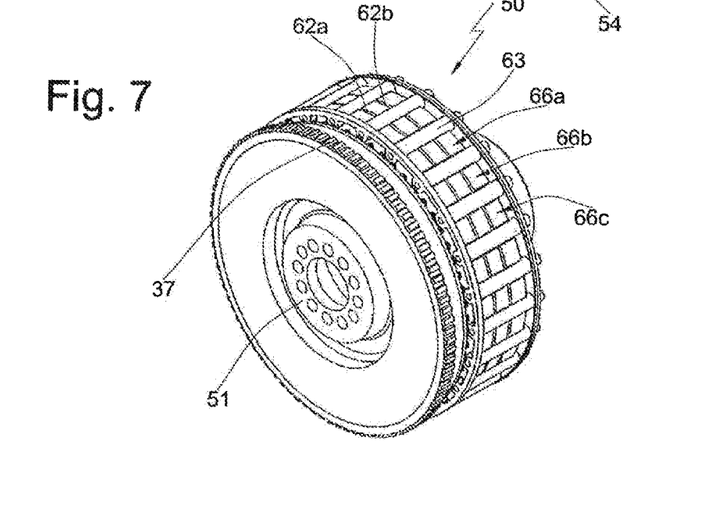
FIG. 7 shows the device of FIG. 6 in a perspective schematic view in a single representation, looking for example along arrow VII in FIG. 6.

With FIGS. 6 and 7, another sample embodiment of a device 50 according to the invention for the damping of torsional vibrations of a crankshaft shall be explained.

The device 50 of FIG. 6 comprises a torsional vibration damper 3, which in this sample embodiment comprises a primary mass 31, which can be fastened by a radially inwardly situated flange section 51 with the aid of schematically represented fastening screws 52 to the output end of the crankshaft 2, not shown in FIGS. 6 and 7. Firmly connected to the primary mass 31 is a wall 53, which provides a chamber 34 having a substantially rectangular cross section. In the chamber 34 is arranged a secondary mass 32 having a likewise rectangular cross section, adapted to the cross section of the chamber 34. The secondary mass 32, as in the previous sample embodiments, can be rotated with the aid of a viscous fluid, not shown in FIG. 6, in the circumferential direction about the radial axis 54 relative to the primary mass 31. A cover 38 is designed to close the chamber 34 with the aid of fastening screws 55*a*, 55*b*.

The fastening screws 55a, 55b are accessible from the side of the torsional vibration damper 3 facing away from the crankshaft 2.

A toothing 37 is arranged radially outside the chamber 34—again being firmly connected to the primary mass 31.

An elastic clutch 56 is arranged in the force flow path from the crankshaft 2, not shown in FIG. 6, to the transmission 57 or generator, merely suggested in FIG. 6, behind the torsional vibration damper 3, or switched in after this.

The elastic clutch 56 comprises a radially inner flange 58, forming the clutch input side, and a radially outer flange 59, providing the clutch output side.

The radially inner flange 58 is connected directly by a fastening element 60 to the primary mass 31.

Between the radially inner flange 58 and the radially outer flange 59 in the sample embodiment of FIGS. 6 and 7 there are arranged three elastomer elements 61a, 61b, 61c.

Between every two neighboring elastomer elements there is provided a slot 62a, 62b for the passage of cooling air.

Likewise, a corresponding opening 63a, 63b is provided on the radially inner flange 58 for the passage of cooling air in the radial direction from the inside to the outside. In this way, the heat created during operation or the heat of the surroundings can be efficiently taken away.

On the output side of the clutch 56 there is provided a closure flange 64—screwed together with the radially outer flange 59 with the aid of fastening elements 63. The closure flange 64 is screwed together by fastening elements 65 with the transmission 57—or with a generator 57, depending on the application.

The respective fastening elements 52, 55, 60, 63, 65 are arbitrary in number.

It is of interest that the fastening elements 60 for the fastening of the elastic clutch 56 to the primary mass 31 are arranged radially outside the fastening elements 52, which serve for the fastening of the primary mass 31 and thus the entire vibrational damper 3 to the crankshaft 2.

Further, it is of interest that the fastening elements 65 for the fastening of the closure flange 64 to the transmission or generator 57 lie on the same or roughly the same radius as the fastening elements 60 for securing the elastic clutch 56 to the primary mass 31.

Further, it is important that the securing of the closure flange 64 to the radially outer flange 59 is done by using fastening elements 63 which—as can best be seen in FIG. 7—leave spaces 66a, 66b, 66c, etc. between them, so that the heat can be taken away even better to the outside.

It is clear from the sample embodiment of FIGS. 6 and 7 that the device 50 as a whole functions as a structural unit or a handling unit. The elastic clutch 56 may be premounted on the vibration damper 3 and form together with it a handling unit, and be secured as a handling unit to the crankshaft 2.

On the other hand, the sample embodiment of FIG. 6 in particular makes it clear that a releasable fastening of the elastic clutch 56 to the vibration damper 3 is also given. The elastic clutch 56 can be secured to the vibration damper 3 from the access direction Z, and also released from it once more.

Furthermore, the device 50 as per FIG. 6 is designed on the whole such that a fastening of transmission or generator 57 relative to the closure flange 64 can be done from the access direction Z, but also a fastening of the closure flange 64 to the radially outer flange 59 is possible from the access direction Z. Likewise, a fastening of the elastic clutch 56 to the primary mass 31, a fastening of the cover 38 to the primary mass 31, and a fastening of the vibration damper 3 or the entire device 50 to the crankshaft 2 can be done from the access direction Z.

Finally, it is clear that even when the closure flange plate 64 is already fastened to the radially outer flange 59, a fastening of the device 50 as a whole, as a handling unit, i.e. comprising vibration damper 3 and elastic clutch 56, to the crankshaft 2 can be done with the aid of the fastening means 52.

LIST OF REFERENCE NUMBERS 1 crankshaft assembly
2 crankshaft
3 torsional vibration damper
4 flywheel
5 drive end of crankshaft
31 primary mass inertia/hub
32 secondary mass inertia/flywheel ring
33 clutch functional section
33a inner ring
33b elastomer clutch ring
33c outer ring
33d segment
34 chamber
35 gap
36 bearing rings
37 toothing
38 cover
S1, S2 torque coupling site
50 device
51 flange section
52 fastening screws
53 wall
54 radial axis
55 a, b fastening screws
56 elastic clutch
57 transmission or generator
58 radially inner flange
59 radially outer flange
60 fastening element
61 a, b, c elastomer elements
62 a, b slots
63 fastening element
64 flange
65 fastening elements
66 a, b, c space
Z access direction

What is claimed is:

1. A crankshaft assembly for an internal combustion engine, comprising:
   a crankshaft;
   a viscosity-type torsional vibration damper for damping elastic resonance torsional vibrations of the crankshaft; and
   an output of the crankshaft assembly, wherein
   the torsional vibration damper comprises a ring-shaped primary mass inertia and a secondary mass inertia,
   the primary mass inertia is firmly connected to the crankshaft and the secondary mass inertia is coupled as a seismic mass by a viscous liquid to the primary mass inertia,
   the ring-shaped primary mass inertia is provided with an encircling toothing on its outer circumference to form a starter rim,
   the torsional vibration damper is arranged at an output end of the crankshaft, and wherein a single integrated component comprises:
i. a clutch functional section,
ii. a flywheel for reducing rotational nonuniformity, and
iii. the torsional vibration damper for damping the resonance torsional vibrations of the crankshaft.

2. The crankshaft assembly as claimed in claim 1, wherein a principal portion of power of the internal combustion engine can be taken off via the torsional vibration damper and the clutch functional section.

3. The crankshaft assembly as claimed in claim 1, wherein the clutch functional section is designed as an elastomer clutch, having an axial and/or a radial layout.

4. The crankshaft assembly as claimed in claim 1, wherein the clutch functional section has a layout such that a radial, an axial, or a diagonal force transmission is made possible.

5. The crankshaft assembly as claimed in claim 4, wherein the clutch functional section comprises a first ring, on which an elastomer clutch ring is secured, and the first ring is coupled to the primary mass inertia and the elastomer clutch ring is secured on a second ring, which is part of an input element of a transmission.

6. The crankshaft assembly as claimed in claim 5, wherein the clutch functional section has a radially inner ring as the first ring, on whose outer circumference the elastomer clutch ring is secured on its inner circumference, while the inner ring is coupled to the primary mass inertia, and
the outer circumference of the elastomer clutch ring is secured on an outer ring as the second ring, which is part of the input element of the transmission.

7. The crankshaft assembly as claimed in claim 5, wherein the clutch functional section has an axially first inner ring as the first ring, on which the elastomer clutch ring is secured axially at a first axial end, wherein the first ring is coupled to the primary mass inertia, and
an axially second end of the elastomer clutch ring is secured axially on the second ring, which is part of the input element of the transmission.

8. The crankshaft assembly as claimed in claim 1, wherein the clutch functional section is designed entirely or partly as an axially pluggable unit.

9. The crankshaft assembly as claimed in claim 1, wherein the clutch functional section is integrated directly in the torsional vibration damper.

10. The crankshaft assembly as claimed in claim 1, wherein
the torsional vibration damper forms a flywheel mass inertia which is divided into the primary mass inertia and the secondary mass inertia, such that the combination of primary and secondary mass inertia at low speeds reduces the rotational nonuniformity of the engine, as in the case of a flywheel, and such that the combination of primary and secondary mass inertia at high speeds and high frequencies behaves like a damper.

11. The crankshaft assembly as claimed in claim 10, wherein
a ratio between the secondary mass inertia and the primary mass inertia is greater than 1/2.

12. The crankshaft assembly as claimed in claim 11, wherein
the ratio between the secondary mass inertia and the primary mass inertia is greater than 1/1.

13. The crankshaft assembly as claimed in claim 10, wherein
the ratio between the secondary mass inertia and the primary mass inertia is 2/1 or greater than 2/1.

14. The crankshaft assembly as claimed in claim 1, wherein
the viscous liquid is a silicone oil.

15. The crankshaft assembly as claimed in claim 1, wherein
the torsional vibration damper is fastened to the output end of the crankshaft and the torsional vibration damper comprises the ring-shaped primary mass inertia, which is firmly connected to the crankshaft, and the secondary mass inertia, which is fashioned as a ring, which is arranged in a chamber of the primary mass inertia, a gap between these two masses being filled with the viscous liquid.

16. A device for damping torsional vibrations of a crankshaft of an internal combustion engine, comprising:
a torsional vibration damper with a ring-shaped primary mass body, which is firmly connected to an output end of the crankshaft, and with a secondary mass body, which is coupled via a viscous fluid to the primary mass body, wherein
the secondary mass body is movable relative to the primary mass body, wherein an elastic clutch is provided, which is connected to the primary mass body, and
wherein the ring-shaped primary mass inertia is provided with an encircling toothing on its outer circumference to form a starter rim.

17. The device as claimed in claim 16, wherein
the elastic clutch is connected after the primary mass body in terms of a force flow path.

18. The device as claimed in claim 16, wherein
the elastic clutch comprises at least one element made of elastic rubber-type material.

19. The device as claimed in claim 16, wherein
the torsional vibration damper forms with the elastic clutch a structural unit or a handling unit.

20. The device as claimed in claim 16, wherein
the elastic clutch is securable releasably on the torsional vibration damper.

21. The device as claimed in claim 16, wherein
the secondary mass body is formed by a ring, which surrounds the primary mass body.

22. The device as claimed in claim 16, wherein
the elastic clutch is provided by a substantially ring-shaped arrangement.

23. The device as claimed in claim 22, wherein
the elastic clutch is positioned radially inside the primary mass body.

24. The device as claimed in claim 22, wherein
the elastic clutch is positioned axially next to the primary mass body and/or axially next to the torsional vibration damper.

* * * * *